(12) United States Patent
Beddok et al.

(10) Patent No.: US 9,982,758 B2
(45) Date of Patent: May 29, 2018

(54) TRANSMISSION ASSEMBLY FOR AN AIRCRAFT AND A HELICOPTER (71) Applicant: SAFRAN HELICOPTER ENGINES, Bordes (FR)

(72) Inventors: Stéphane Beddok, Pau (FR); Jean-Michel Bazet, Gelos (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days. days.

(21) Appl. No.: 15/129,356

(22) PCT Filed: Mar. 20, 2015

(86) PCT No.: PCT/FR2015/050707
§ 371 (c)(1),
(2) Date: Sep. 26, 2016

(87) PCT Pub. No.: WO2015/145046
PCT Pub. Date: Oct. 1, 2015

(65) Prior Publication Data
US 2017/0175856 A1 Jun. 22, 2017

(30) Foreign Application Priority Data
Mar. 27, 2014 (FR) ..................................... 14 52615

(51) Int. Cl.
*F16H 3/72* (2006.01)
*B64C 27/14* (2006.01)
(52) U.S. Cl.
CPC ............ *F16H 3/725* (2013.01); *B64C 27/14* (2013.01)
(58) Field of Classification Search
None
See application file for complete search history.

(56) References Cited

U.S. PATENT DOCUMENTS 8,784,247 B2 * 7/2014 Justin ........................ F01P 5/04
   475/5
9,174,741 B2 * 11/2015 Suntharalingam ..... B64D 27/02
(Continued)

FOREIGN PATENT DOCUMENTS

EP     1 145 896 A1    10/2001
EP     2 404 775 A2     1/2012
WO    WO 2009/118298 A1 10/2009

OTHER PUBLICATIONS

International Search Report in corresponding International Application No. PCT/FR2015/050707 dated Jun. 3, 2015 (5 pages—English Translation included).

*Primary Examiner* — Dirk Wright
(74) *Attorney, Agent, or Firm* — Bookoff McAndrews, PLLC (57) ABSTRACT

A transmission assembly for an aircraft, and a helicopter including such an assembly for controlling independently the speed of rotation of an engine and of a torque receiver. According to the invention, the assembly comprises a first inlet shaft (10a) configured to receive torque from a first engine (10), an outlet shaft (60a) configured to transmit torque to a torque receiver (60), a first transmission member (20) having at least two degrees of freedom and comprising first, second, and third movable portions, a first reversible electrical regulator machine (30), and a first reversible electrical balancing machine (40), wherein the inlet shaft (10a) is coupled to the first movable portion, the outlet shaft (60a) is coupled to the second movable portion, the first electrical regulator machine (30) is coupled to the third movable portion, and the first electrical balancing machine (40) is coupled in series with the inlet shaft or the outlet shaft (60a).

12 Claims, 4 Drawing Sheets

(56) References Cited

U.S. PATENT DOCUMENTS

| | | | |
|---|---|---|---|
| 9,290,266 B2* | 3/2016 | Robertson | B64C 27/12 |
| 2016/0146332 A1* | 5/2016 | Taniguchi | F16H 57/0479 |
| | | | 475/5 |
| 2016/0172935 A1* | 6/2016 | Mountain | H02K 7/20 |
| | | | 310/68 D |
| 2016/0252063 A1* | 9/2016 | Mordukhovich | F02M 59/20 |
| | | | 417/364 |

* cited by examiner

TRANSMISSION ASSEMBLY FOR AN AIRCRAFT AND A HELICOPTER

CROSS-REFERENCE TO RELATED APPLICATIONS

This application is the U.S. national phase entry under 35 U.S.C. § 371 of International Application No. PCT/FR2015/050707, filed on Mar. 20, 2015, which claims priority to French Patent Application No. 1452615, filed on Mar. 27, 2014.

FIELD OF THE INVENTION

The present description relates to a transmission assembly for an aircraft and also to a helicopter including such an assembly.

Such a transmission assembly may be used to control independently the speed of rotation of an engine and the speed of rotation of a torque receiver in order to optimize the speed of each of them. This is useful in particular in the field of aviation, and more particularly in the field of helicopters.

STATE OF THE PRIOR ART

In a conventional helicopter, it is usual to connect the gas turbine(s) of the aircraft to equipment that takes off mechanical power such as the main gearbox (MGB), the alternator, or indeed the load compressor. Under such circumstances, the speed of the gas turbine is imposed by the equipment to which it is connected: this is problematic since the imposed speed does not necessarily correspond to an energy optimum for the entire system (the gas turbine or the receiver).

In particular, with an auxiliary power unit (APU), some of the equipment connected to the APU operates at speeds that vary depending on loading: this leads to the APU running at an imposed speed that varies, which leads to running it in irregular manner, and is therefore harmful for its fuel consumption.

Helicopter propulsion is itself likewise concerned by this problem. Specifically, the turbine engines drive the main rotor of the helicopter via the main gearbox (MGB): the speed of rotation of the main rotor thus imposes a speed of rotation on the turbine engines (as scaled by the reduction ratio of the MGB). However, under certain conditions of flight, it is found that this imposed speed does not correspond to the optimum speed for the turbine engines, and that is unfavourable for fuel consumption.

In order to solve that problem, a first solution consists in controlling the speed of rotation of the main rotor so as to approach the turbine speed that is the most suitable. Nevertheless, that solution is limited, since it is not possible to vary that speed beyond a narrow range without affecting flight safety.

There therefore exists a real need for a transmission assembly and a helicopter that enable the engine speed to be optimized independently of the speed of the torque receiver and that are exempt, at least in part, from the drawbacks inherent to the above-mentioned known configurations.

SUMMARY OF THE INVENTION

The present description provides an aircraft transmission assembly comprising a first inlet shaft configured to receive torque from a first engine, an outlet shaft configured to transmit torque to a torque receiver, a first transmission member having at least two degrees of freedom and comprising first, second, and third movable portions, a controllable first reversible electrical regulator machine, and a first reversible electrical balancing machine, wherein the inlet shaft is coupled to the first movable portion, the outlet shaft is coupled to the second movable portion, the first electrical regulator machine is coupled to the third movable portion, and the first electrical balancing machine is coupled in series with the inlet shaft or the outlet shaft.

In the present description, the term "transmission member having at least two degrees of freedom" is used to mean a transmission member that associates at least three movable portions presenting travel speeds that are associated by a single mathematical relationship. For example, in a transmission member having two degrees of freedom, it is necessary to set the speeds of two of the movable portions in order to determine the speed of the third.

Thus, by means of such a configuration including a transmission member having two degrees of freedom, it is possible to control the speed of the regulator machine positively or negatively so as to enable either the torque receiver to operate at variable speed for constant engine speed, or else the engine to operate at variable speed for constant torque receiver speed. It is thus possible to obtain savings in terms of fuel consumption or gains in terms of performance.

Specifically, knowing the nominal speed of rotation of the torque receiver and knowing the speed of rotation desired for the engine, the mathematical relationship of the transmission member makes it possible to calculate the speed at which the electrical regulator machine needs to be controlled.

The regulator machine may particular be controlled as a function of flight conditions in order to follow variations in the nominal speed for the torque receiver or variations in the optimum speed for the engine, thereby enabling significant savings to be obtained in fuel consumption and/or significant gains to be obtained in performance for all stages of flight.

When the electrical regulator machine is operating as a torque receiver, it converts the mechanical power it takes off into electrical power that can be used by the on-board equipment and/or by the electrical balancing machine. The electrical balancing machine then operates as a motor consuming electrical power in order to restore mechanical power to the torque receiver, which mechanical power is equivalent to the power taken off by the electrical regulator machine.

Conversely, when the electrical regulator machine operates as a motor, it consumes electrical power, thereby injecting additional mechanical power into the system. The electrical balancing machine then operates as a torque receiver converting into electrical power mechanical power that is equivalent to the additional power injected by the electrical regulator machine.

Thus, it is possible to control the speed of the engine while providing effective transmission of mechanical power from the engine to the torque receiver and without giving rise to an undesired reduction or increase in power. Nevertheless, the electrical machines may also be controlled so as to obtain a nonzero power budget for the purpose of delivering additional electrical power to on-board equipment or, on the contrary, for the purpose of supplying additional mechanical power to the torque receiver during certain stages of flight.

In certain embodiments, the assembly further comprises an energy storage device configured to exchange electrical energy both with the first electrical regulator machine and also with the first electrical balancing machine. It is thus possible to store any surplus energy generated when there is a nonzero power balance between the electrical regulator machine and the electrical balancing machine. The storage device may be connected to the on-board electricity network.

In certain embodiments, the assembly further comprises a freewheel coupled in series between the first electrical regulator machine and the first transmission member. This is particularly useful in the event of the electrical regulator machine failing while the engine speed is faster than the speed of the equipment in order to ensure a reduction ratio between the engine and the equipment.

In certain embodiments, the first transmission member is an epicyclic gear train having a sun gear, planet gears connected to a planet carrier, and a ring.

The present description also provides a helicopter having a first engine, including at least a first turbine engine, a rotor, and a transmission assembly according to any of the above embodiments, the transmission assembly being configured to transmit torque coming from the first engine to the rotor. Such a configuration makes it possible to decouple the speed of the turbine engine from the speed of the rotor.

In certain embodiments, the helicopter also has a main gearbox (MGB). Such an MGB includes an epicyclic gear train providing a speed step-down ratio between the turbine engine and the rotor. In certain embodiments, the MGB may be used as the first transmission member.

In certain embodiments, the planet carrier of the first transmission member, which is distinct from the MGB and constitutes the first movable portion of the transmission member, is coupled to the first engine, the ring of the first transmission member, constituting its second movable portion, is coupled to an inlet of the main gearbox, and the sun gear of the first transmission member, constituting its third movable portion, is coupled to the first electrical regulator machine. In this configuration, the transmission member provides a reduction of speed between the turbine engine and the inlet of the MGB: this speed reduction can be adjusted by controlling the speed of the electrical regulator machine, thereby enabling the turbine engine to be controlled to operate at its optimum speed.

In certain embodiments, the helicopter further comprises a second engine, including at least one turbine engine, a second transmission member analogous to the first transmission member, a second reversible electrical regulator machine, and a second reversible electrical balancing machine.

In certain embodiments, the helicopter comprises a common energy storage device configured to exchange electrical energy with the first and second electrical regulator machines and with the first and second electrical balancing machines. In such helicopters having a plurality of turbine engines, this configuration makes it possible to share the energy storage device, thereby reducing costs and also reducing on-board volume and weight.

In certain embodiments, the first and second electrical balancing machines form a single common electrical balancing machine that is coupled to the third movable portions of the first and second transmission members. This sharing reduces costs and also reduces on-board volume and weight.

In certain embodiments, the first and second electrical balancing machines form a single common electrical balancing machine coupled in series between the outlet from the main gearbox and the rotor. This sharing reduces costs and also reduces on-board volume and weight.

Naturally, these various kinds of sharing can be envisaged in analogous manner for any number of engines.

In certain embodiments, the helicopter comprises a main gearbox (MGB) including an epicyclic gear train constituting the first transmission member. This takes advantage of the epicyclic gear train that is conventionally present in an MGB, thus making it possible to avoid having an additional specific gearbox member.

In certain embodiments, the sun gear of the first transmission member, constituting its first movable portion, is coupled to the first engine, the planet carrier of the first transmission member, constituting its second movable portion, is coupled to the rotor, and the ring of the first transmission member, constituting its third movable portion, is coupled to the first electrical regulator machine. In this configuration, the transmission member reduces speed between the turbine engine and the rotor: this speed reduction is adjustable by controlling the speed of the electrical regulator machine, thereby enabling the turbine engine to be controlled to operate at its optimum speed.

In certain embodiments, the first electrical balancing machine is coupled in series between the first movable portion of the transmission member and said inlet of the main gearbox.

In certain embodiments, the first electrical balancing machine is coupled in series between the first engine and the first movable portion of the transmission member.

In certain embodiments, the first electrical balancing machine is coupled in series between the outlet from the main gearbox and the rotor.

In certain embodiments, the first engine further comprises a second turbine engine and an intermediate transmission box having a first inlet coupled to the first turbine engine, a second inlet coupled to the second turbine engine, and an outlet coupled to the first movable portion of the first transmission member.

The above-described characteristics and advantages, and others, appear on reading the following detailed description of embodiments of the proposed transmission assembly and helicopter. The detailed description refers to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of element) that are identical are identified by the same reference signs. Also, elements (or portions of element) belonging to embodiments that are different, but that have functions that are analogous, are identified in the figures by numerical references incremented by 100, 200, etc.

DETAILED DESCRIPTION OF EMBODIMENT(S)

In order to make invention more concrete, embodiments of the helicopter transmission assembly are described in detail below with reference to the accompanying drawings. It should be recalled that the invention is not limited to these embodiments.

Figure 1:
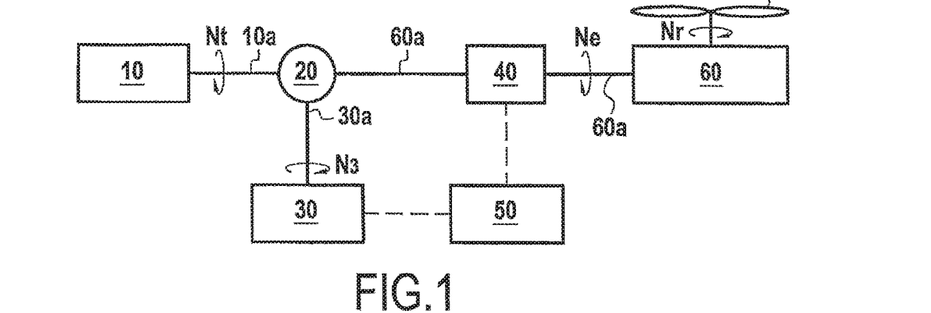
FIG. 1 is a block diagram of a first embodiment of a transmission assembly.
Figure 2:
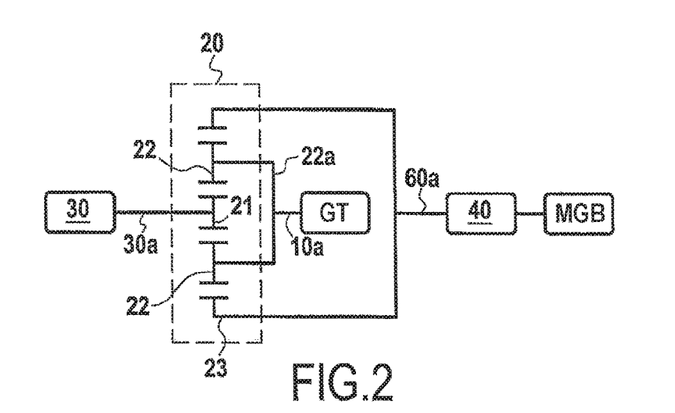
FIG. 2 shows the configuration of the transmission member in the first embodiment.
Figure 3:
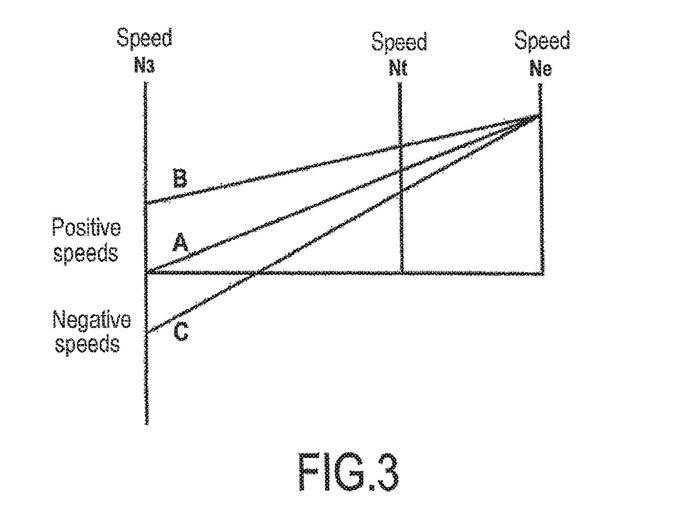
FIG. 3 is a graph showing different speeds for the first embodiment as a function of the selected piloting.

FIGS. 1, 2, 3 show a first embodiment of a helicopter having a rotor 90 driven in rotation by a gas turbine 10 via a main gearbox (MGB) 60. On a helicopter, the MGB 60 is a mechanical assembly for transmitting power, with a reduction in speed, from the engine(s) 10 to the rotor 90; the MGB may also provide an angle transmission between the drive shaft and the rotor shaft, and may also serve to drive various accessories such as pumps or alternators.

The speed of rotation Nr of the rotor 90 is imposed by flight requirements: this speed Nr thus also imposes the speed of rotation Nt of the turbine engine 10 via the transmission assembly as a function of its stepdown ratio, with the MGB 60 contributing in particular to provide this ratio.

In this first embodiment, the transmission assembly comprises an epicyclic gear train 20 having a sun gear 21, planet gears 22 mounted on a planet carrier 22a, and a ring 23.

The planet carrier 22a is coupled to the drive shaft 10a of the gas turbine 10. The ring 23 is coupled to the inlet shaft 60a of the MGB 60. The sun gear 21 is coupled via a shaft 30a to a controllable reversible electrical machine 30 of the speed-change drive unit type referred to as the electrical regulator machine.

A second reversible electrical machine 40, referred to as a balancing machine, is provided on the shaft 60a between the epicyclic gear train 20 and the MGB 60.

An energy storage device 50 is provided so as to be capable of exchanging electrical energy with the speed-change drive unit 30 and with the balancing machine 40.

There follows an explanation of the operation of this first embodiment of the transmission assembly, given with reference to FIG. 3, which shows the speeds of rotation: N3 of the speed-change drive unit 30, Nt of the gas turbine 10, and Ne of the inlet shaft 60a of the MGB 60.

When it is desired to servocontrol Nt on a speed equal to Ne as changed by the ratio of the epicyclic gear train 20, the speed-change drive unit 30 is controlled on zero speed: this configuration balances the speeds and is represented by the line A.

When it is desired to servocontrol Nt on a speed faster than the equilibrium speed, the speed of the speed-change drive unit 30 is controlled towards a positive value: this configuration is represented by the line B. In this configuration, the speed-change drive unit 30 takes off mechanical energy: this energy is converted into electricity, transmitted to the storage device 50, and transferred by the storage device to the balancing machine 40, which then re-converts it into mechanical energy and restores it to the inlet shaft 60a of the MGB 60 in order to satisfy its power need.

Conversely, when it is desired to servocontrol Nt on a speed slower than the equilibrium speed, the speed of the speed change drive unit 30 is controlled towards a negative value: this configuration is represented by the line C. In this configuration, the speed-change drive unit 30 injects mechanical energy into the system: in order to balance powers, an equivalent quantity of energy is taken from the inlet shaft 60a of the MGB 60 by the balancing machine 40, is converted into electricity, and is transferred to the speed-change drive unit 30 by the storage device 50.

Figure 10:
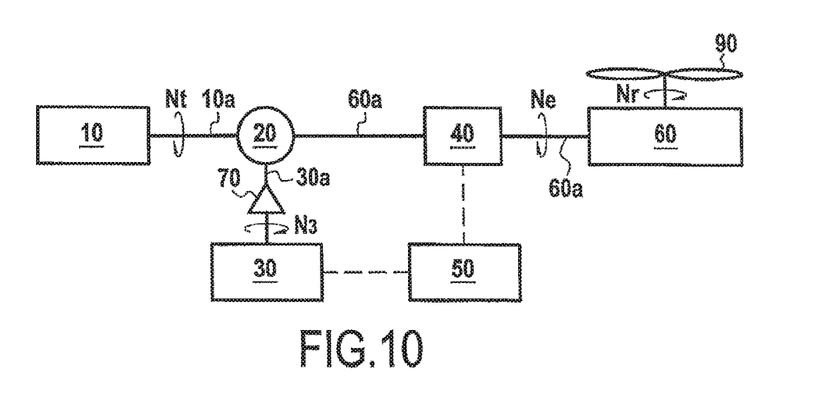
FIG. 10 shows a variant of the FIG. 1 embodiment.

In a variant shown in FIG. 10, a freewheel 70 may be provided on the shaft 30a between the electrical regulator machine 30 and the epicyclic gear train 20.

FIGS. 4 to 7 show other variants of this first embodiment when the helicopter has two gas turbines driving the same rotor.

Figure 4:
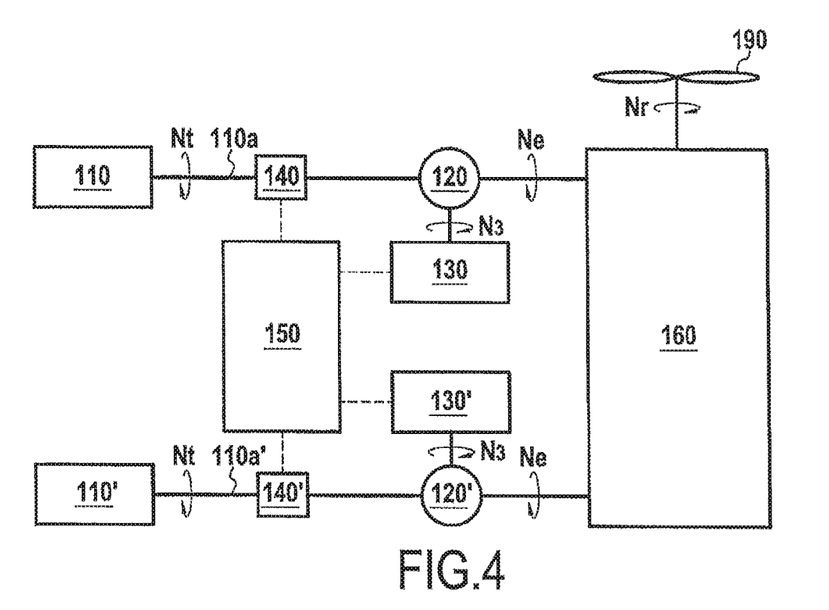
FIG. 4 is a block diagram of a second embodiment of a transmission assembly.

In the second embodiment shown in FIG. 4, the helicopter has two power lines, each driven by a respective gas turbine 110, 110', which power lines are combined within the MGB 160 in order to drive the rotor 190.

Each power line has a respective epicyclic gear train 120, 120' and a respective speed-change drive unit 130, 130' that are connected in a manner analogous to the first embodiment.

Nevertheless, in this second embodiment, the transmission assembly has first and second reversible electrical balancing machines 140, 140' provided on respective drive shafts 110a, 110a', i.e. between their respective gas turbines 110, 110' and epicyclic gear trains 120, 120'.

Also, the transmission assembly has a single energy storage device 150 capable of exchanging electrical energy with the first speed-change drive unit 130, the second speed-change drive unit 130', the first electrical balancing machine 140, and the second electrical balancing machine 140'.

Figure 5:
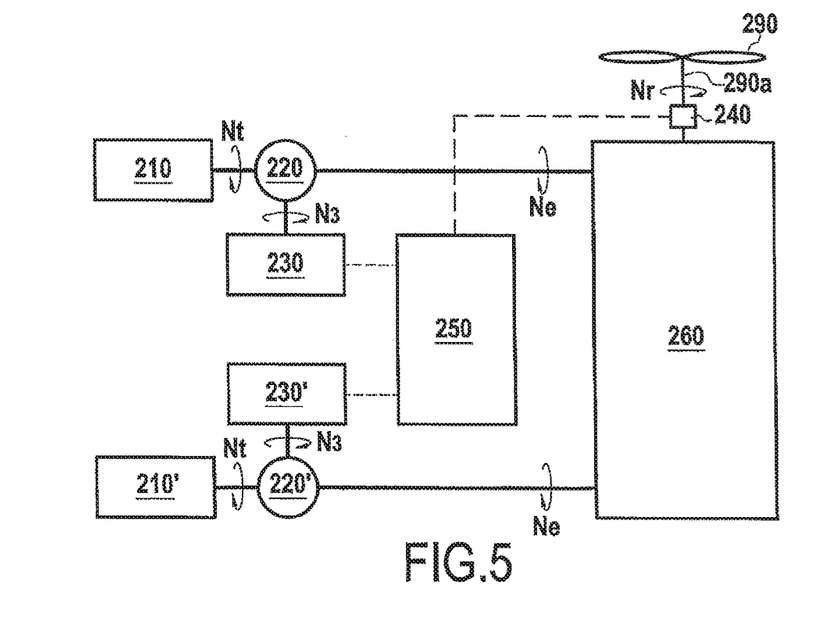
FIG. 5 is a block diagram of a third embodiment of a transmission assembly.

The third embodiment, shown in FIG. 5, is analogous to the second embodiment except that it has a single reversible electrical balancing machine 240 provided on the rotor shaft 290a, i.e. on the outlet shaft of the MGB 260.

Figure 6:
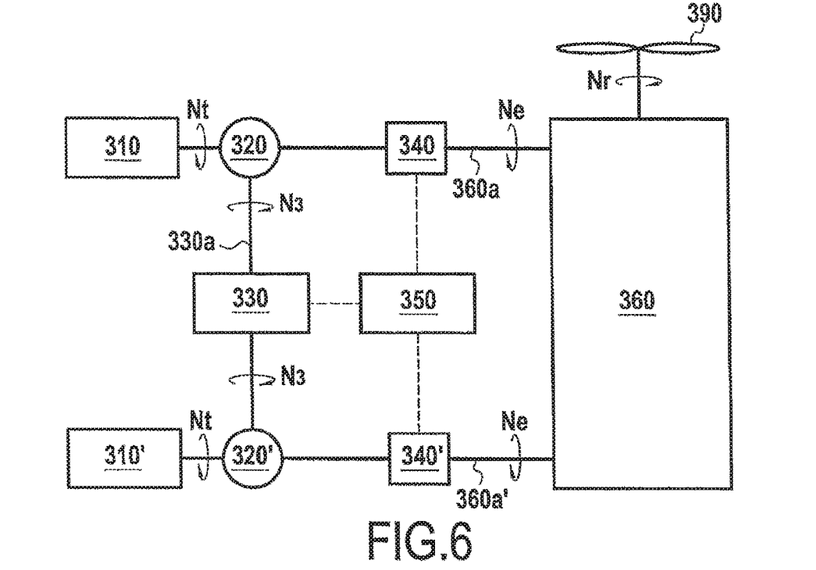
FIG. 6 is a block diagram of a fourth embodiment of a transmission assembly.

The fourth embodiment, shown in FIG. 6, is analogous to the second embodiment except that instead of the first and second speed-change drive units, it has a single speed-change drive unit 330 common to the first and second power lines. More precisely, the sun gears 21 of both epicyclic gear trains 320, 320' are coupled with the common speed-change drive unit 330 via a single shaft 330a.

Furthermore, the first and second reversible electrical balancing machines 340, 340' are provided on their respective inlet shafts 360a, 360a' of the MGB, i.e. between their respective epicyclic gear trains 320, 320' and the MGB 360.

Figure 7:
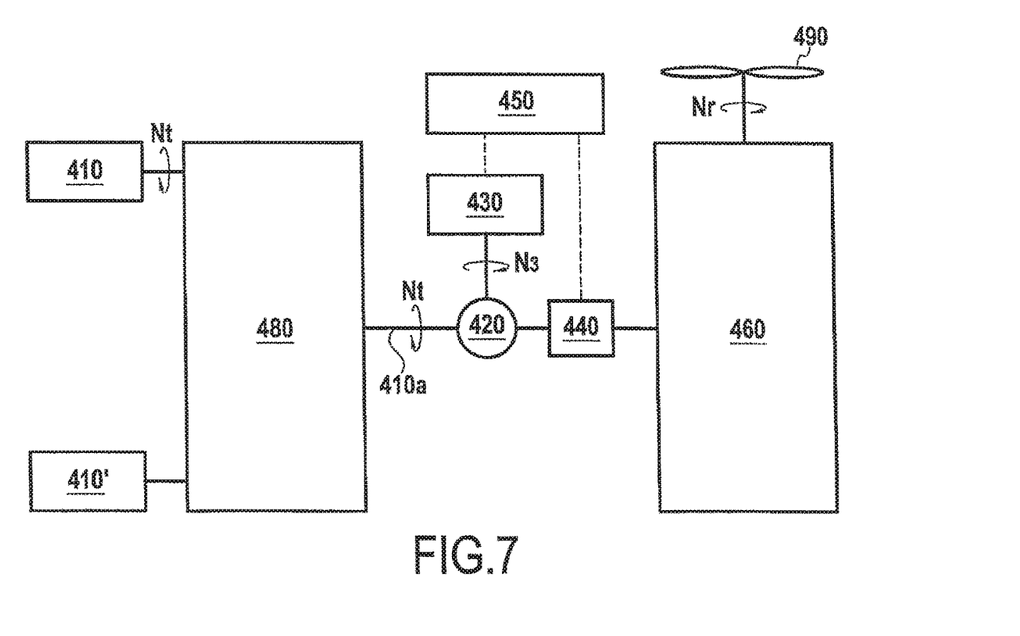
FIG. 7 is a block diagram of a fifth embodiment of a transmission assembly.

In the fifth embodiment, shown in FIG. 7, the transmission assembly includes an intermediate transmission box 480 that has a first inlet coupled to the first gas turbine 410 and a second inlet coupled to the second gas turbine 410'. The intermediate transmission box 480 combines these two inlets and outputs the combined power from the two gas turbines 410, 410' via a combined drive shaft 410a.

The configuration that is then to be found at the outlet from the intermediate box 480 is analogous to the configuration of the first embodiment.

Figure 8:
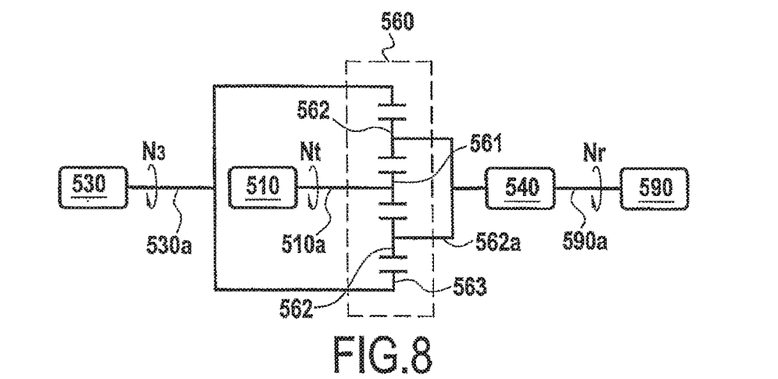
FIG. 8 shows the configuration of the transmission member in a sixth embodiment.
Figure 9:
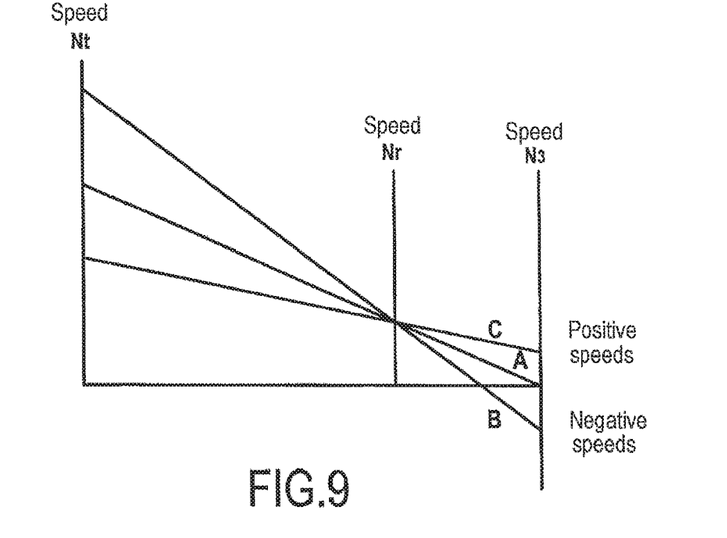
FIG. 9 is a graph showing different speeds for the sixth embodiment as a function of the selected piloting.

FIGS. 8 and 9 show a sixth embodiment of a helicopter having a rotor 580 driven in rotation by a gas turbine 510 via a main gearbox (MGB) 560. In this sixth embodiment, the epicyclic gear train of the MGB enables the invention to be performed without introducing an additional epicyclic gear train.

The sun wheel 561 of the MGB 560 is coupled to the drive shaft 510a of the gas turbine 510. The planet carrier 562a is coupled to the rotor shaft 590a of the rotor 590. While the ring 563 is coupled via the shaft 530a to the speed-change drive unit 530. An electrical reversible balancing machine 540 is provided on the rotor shaft 590a between the MGB 560 and the rotor 590.

There follows an explanation of the operation of this sixth embodiment of the transmission assembly, given with reference to FIG. 9, which shows the speeds of rotation: N3 of the speed-change drive unit 530, Nt of the as turbine 510, and Nr of the rotor 590.

When it is desired to servocontrol Nt on a speed equal to Nr, as changed by the reduction ratio of the MGB 560, the speed-change drive unit 530 is controlled on zero speed: this configuration balances the speeds and is represented by the line A.

When it is desired to servocontrol Nt on a speed faster than the equilibrium speed, the speed of the speed-change drive unit 530 is controlled towards a negative value: this configuration is represented by the line B. In this configuration, the speed-change drive unit 530 takes off mechanical energy: this energy is converted into electricity, transmitted to the storage device, and transferred by the storage device to the balancing machine 540, which then re-converts it into mechanical energy and restores it to the rotor shaft 590a in order to satisfy its power need.

Conversely, when it is desired to servocontrol Nt on a speed slower than the equilibrium speed, the speed of the speed-change drive unit is controlled towards a positive value: this configuration is represented by the line C. In this configuration, the speed-change drive unit 530 injects mechanical energy into the system: in order to balance powers, an equivalent quantity of energy is taken from the rotor shaft 590a by the balancing machine 540, is converted into electricity, and is transferred to the speed-change drive unit 530 by the storage device.

The embodiments or implementations described in the present description are given by way of nonlimiting illustration, it being easy in the light of this description for a person skilled in the art to modify these embodiments or implementations, or to envisage others, while remaining within the ambit of the invention. In particular, the present description applies equally well to gas turbines having a free turbine and to gas turbines having a linked turbine.

Furthermore, the various characteristics of these implementations or embodiments may be used on their own or combined with one another. When they are combined, these characteristics may be combined as described above or in other ways, the invention not being limited to the specific combinations described in the present description. In particular, unless specified to the contrary, a characteristic described with reference to any one implementation or embodiment may be applied in analogous manner to any other implementation or embodiment.

The invention claimed is:

1. A helicopter comprising:
a first engine including at least a first turbine engine, a main gearbox, a helicopter rotor, accessories, and a transmission assembly, the main gearbox transmitting power, with a reduction in speed, from the first engine to the helicopter rotor and driving the accessories, the transmission assembly being configured to transmit torque coming from the first engine to the main gearbox;
wherein the transmission assembly comprises a first inlet shaft configured to receive torque from the first engine; an outlet shaft configured to transmit torque to the main gearbox;
a first transmission member with at least two degrees of freedom comprising first, second, and third movable portions;
a controllable first reversible electrical regulator machine; and
a first reversible electrical balancing machine;
wherein the inlet shaft is coupled to the first movable portion;
the outlet shaft is coupled to the second movable portion;
the first electrical regulator machine is coupled to the third movable portion; and
the first electrical balancing machine is coupled in series with the inlet shaft or the outlet shaft.

2. The helicopter according to claim 1, wherein the transmission assembly further comprises an energy storage device configured to exchange electrical energy both with the first electrical regulator machine and also with the first electrical balancing machine.

3. The helicopter according to claim 1, wherein the transmission assembly further comprises a freewheel coupled in series between the first electrical regulator machine and the first transmission member.

4. The helicopter according to claim 1, wherein the first transmission member is an epicyclic gear train having a sun gear, planet gears connected to a planet carrier, and a ring.

5. The helicopter according to claim 4,
wherein the planet carrier of the first transmission member, constituting its first movable portion, is coupled to the first engine;
the ring of the first transmission member, constituting its second movable portion, is coupled to an inlet of the main gearbox; and
the sun gear of the first transmission member, constituting its third movable portion, is coupled to the first electrical regulator machine.

6. The helicopter according to claim 5, further comprising a second engine, including at least one turbine engine, a second transmission member analogous to the first transmission member, a controllable second reversible electrical regulator machine, and a second reversible electrical balancing machine; and
comprising a common energy storage device configured to exchange electrical energy with the first and second electrical regulator machines and with the first and second electrical balancing machines.

7. The helicopter according to claim 6, wherein the first and second electrical balancing machines form a single common electrical balancing machine that is coupled to the third movable portions of the first and second transmission members.

8. The helicopter according to claim 6, wherein the first and second electrical balancing machines form a single common electrical balancing machine coupled in series between the outlet from the main gearbox and the helicopter helicopter rotor.

9. The helicopter according to claim 1, wherein the first engine further comprises a second turbine engine and an intermediate transmission box having a first inlet coupled to the first turbine engine, a second inlet coupled to the second turbine engine, and an outlet coupled to the first movable portion of the first transmission member.

10. A helicopter comprising:
a first engine including at least a first turbine engine, a rotor, and a transmission assembly, the transmission assembly being configured to transmit torque coming from the first engine to the rotor;
wherein the transmission assembly comprises a first inlet shaft configured to receive torque from the first engine;
an outlet shaft configured to transmit torque to the rotor;

a first transmission member with at least two degrees of freedom comprising first, second, and third movable portions;
a controllable first reversible electrical regulator machine; and
a first reversible electrical balancing machine;
wherein the inlet shaft is coupled to the first movable portion;
the outlet shaft is coupled to the second movable portion;
the first electrical regulator machine is coupled to the third movable portion; and
the first electrical balancing machine is coupled in series with the inlet shaft or the outlet shaft;
wherein the transmission assembly further comprises a freewheel coupled in series between the first electrical regulator machine and the first transmission member.

11. A helicopter comprising:
a first engine including at least a first turbine engine, a rotor, and a transmission assembly, the transmission assembly being configured to transmit torque coming from the first engine to the rotor;
wherein the transmission assembly comprises a first inlet shaft configured to receive torque from the first engine;
an outlet shaft configured to transmit torque to the rotor;
a first transmission member with at least two degrees of freedom comprising first, second, and third movable portions;
a controllable first reversible electrical regulator machine; and
a first reversible electrical balancing machine;
wherein the inlet shaft is coupled to the first movable portion;
the outlet shaft is coupled to the second movable portion;
the first electrical regulator machine is coupled to the third movable portion; and
the first electrical balancing machine is coupled in series with the inlet shaft or the outlet shaft,
further comprising a second engine, including at least one turbine engine, a second transmission member analogous to the first transmission member, a controllable second reversible electrical regulator machine, and a second reversible electrical balancing machine; and
comprising a common energy storage device configured to exchange electrical energy with the first and second electrical regulator machines and with the first and second electrical balancing machines.

12. A helicopter comprising a first engine including at least a first turbine engine, a rotor, and a transmission assembly, the transmission assembly being configured to transmit torque coming from the first engine to the rotor;
wherein the transmission assembly comprises a first inlet shaft configured to receive torque from the first engine;
an outlet shaft configured to transmit torque to the rotor;
a first transmission member with at least two degrees of freedom comprising first, second, and third movable portions;
a controllable first reversible electrical regulator machine; and
a first reversible electrical balancing machine;
wherein the inlet shaft is coupled to the first movable portion;
the outlet shaft is coupled to the second movable portion;
the first electrical regulator machine is coupled to the third movable portion; and
the first electrical balancing machine is coupled in series with the inlet shaft or the outlet shaft;
wherein the first engine further comprises a second turbine engine and an intermediate transmission box having a first inlet coupled to the first turbine engine, a second inlet coupled to the second turbine engine, and an outlet coupled to the first movable portion of the first transmission member.

\* \* \* \* \*